(No Model.) 3 Sheets—Sheet 1.
C. E. CURTISS.
CORN HUSKING AND FODDER PREPARING MACHINE.
No. 561,539. Patented June 2, 1896.
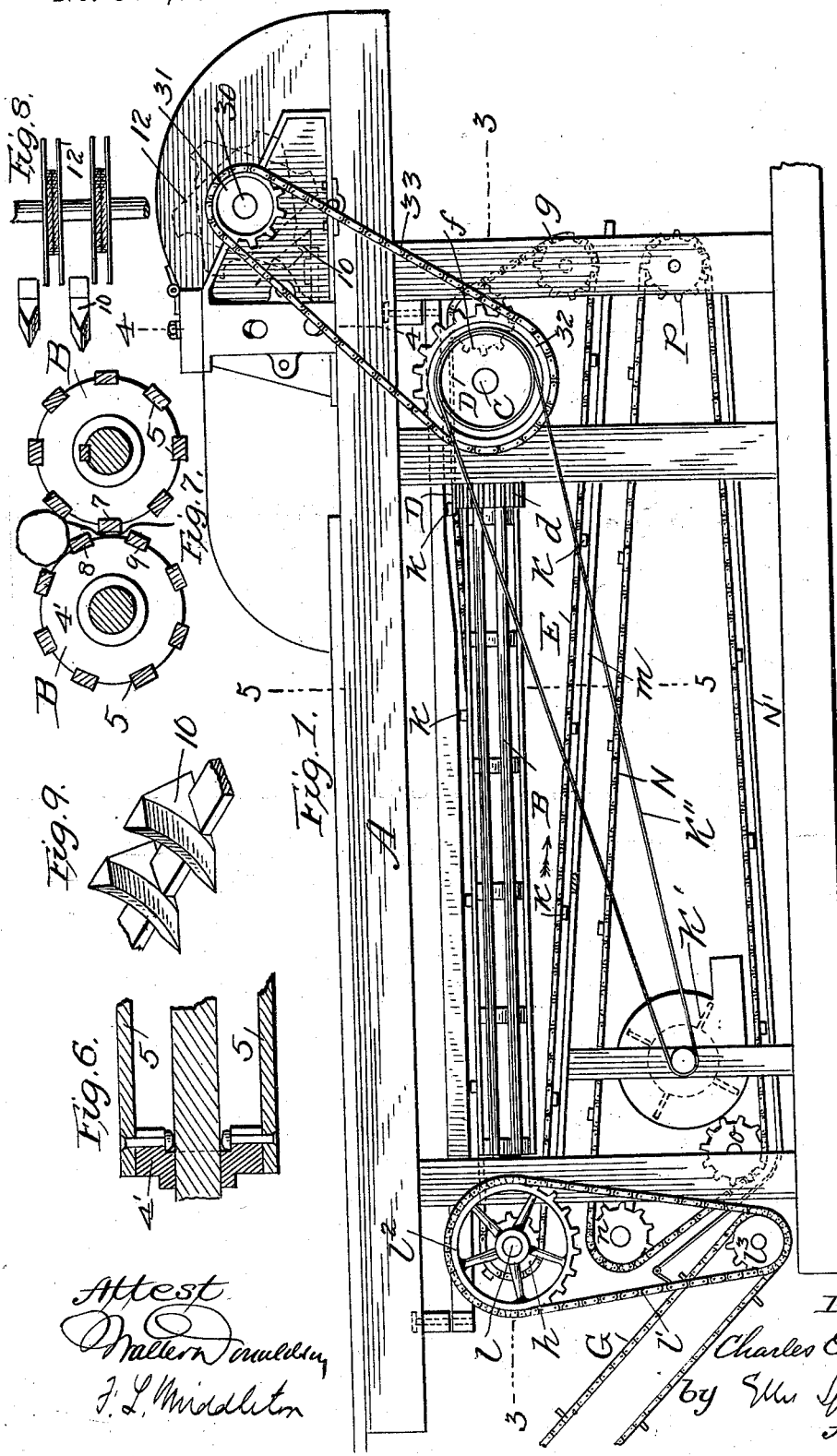

(No Model.) 3 Sheets—Sheet 2.
C. E. CURTISS.
CORN HUSKING AND FODDER PREPARING MACHINE.
No. 561,539. Patented June 2, 1896.
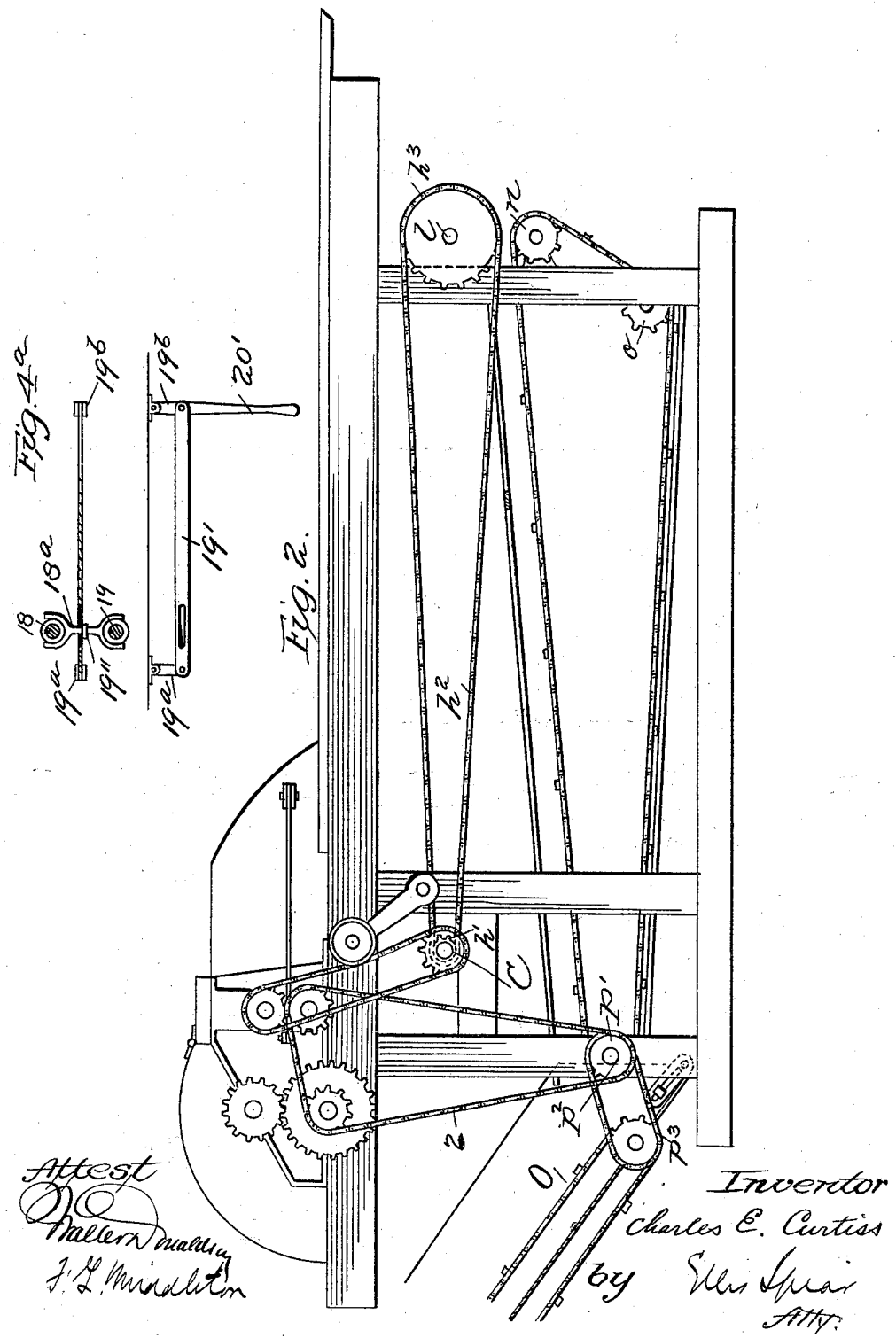

(No Model.) 3 Sheets—Sheet 3.
C. E. CURTISS.
CORN HUSKING AND FODDER PREPARING MACHINE.
No. 561,539. Patented June 2, 1896.
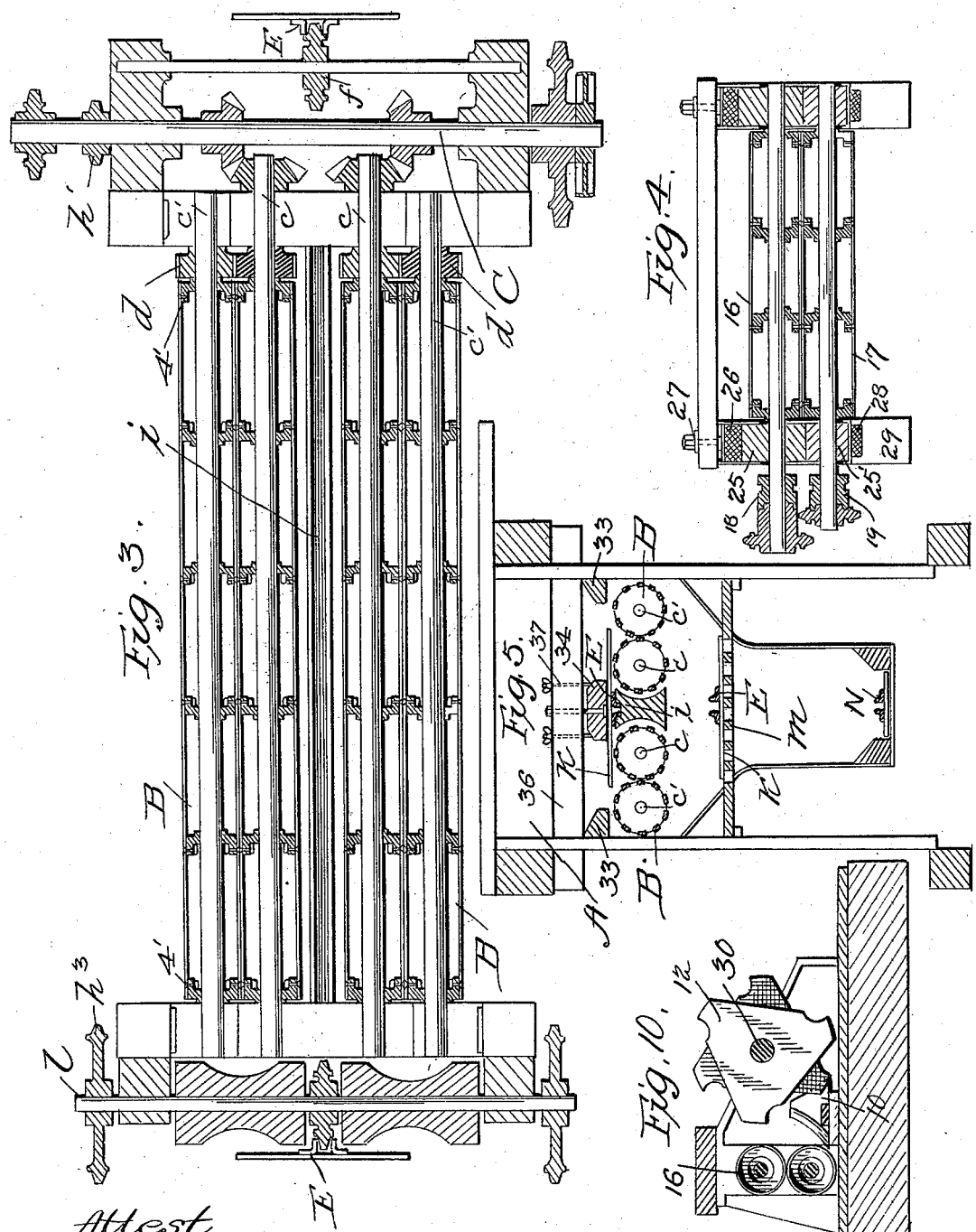

UNITED STATES PATENT OFFICE.

CHARLES E. CURTISS, OF CLINTON, WISCONSIN.

CORN-HUSKING AND FODDER-PREPARING MACHINE.

SPECIFICATION forming part of Letters Patent No. 561,539, dated June 2, 1896.

Application filed May 7, 1895. Serial No. 548,440. (No model.)

*To all whom it may concern:*

Be it known that I, CHARLES E. CURTISS, a citizen of the United States, residing at Clinton, in the county of Rock and State of Wisconsin, have invented certain new and useful Improvements in Corn-Husking and Fodder-Preparing Machines, of which the following is a specification, reference being had therein to the accompanying drawings.

My invention relates to corn-husking machines of that class in which the ears are caused to pass longitudinally along rollers.

It includes improvements in the rollers and in the auxiliary mechanism for delivering and conveying the materials at various stages of the process and mechanism for slitting the stalks as they leave the ear-releasing mechanism, the machine complete, as shown, being adapted to operate upon the corn as it comes from the shock.

My invention is illustrated in the accompanying drawings, in which—

Figure 1 shows the apparatus in side elevation. Fig. 2 is a similar elevation of the opposite side of the machine. Fig. 3 shows a sectional plan view on line 3 3 of Fig. 1; Fig. 4, a front sectional view on line 4 4 of Fig. 1. Fig. 4ª is views of the clutch mechanism for operating the snapping-rollers; Fig. 5, a cross-section on line 5 5 of Fig. 1; Fig. 6, a sectional detail view of the roller. Fig. 7 is a sectional view of a pair of husking-rollers. Fig. 8 is a detail of the cutting-knives. Fig. 9 is a detail of the guides for the stalk. Fig. 10 is a detail view showing the relation between the cutters, the snapping-rollers, and the guides.

The frame A, of ordinary construction, supports the working parts. In this frame are longitudinally-arranged husking-rollers B, the construction and arrangement of which are more clearly shown in Figs. 5 and 7. There are two pairs shown, although one pair or more may be used in the same machine.

The rolls of each pair are arranged side by side and turn toward each other on their upper surfaces, being close enough to prevent the ears from passing down through between the rollers, but serving, as is usual with rollers of this class, to strip off the husk which passes down between the rollers, while the ear moves onward to and over the ends of the rollers. In this machine the rollers are arranged horizontally.

The peculiar construction of my rollers is hereinafter described. They are driven from a shaft C, mounted in the frame and connected to the shafts $c$ of one of each pair of husking-rolls by means of beveled gears, as shown in Fig. 3. The shafts $c$ are connected to the shaft $c'$ of the other member of each pair of rolls by means of gears, which mesh loosely with each other. The ears of corn fall upon a plate D, Fig. 1, which covers the shaft C and extends with its edge over the connecting-gears $d$ and onto the rolls, so that the ears as they drop rest first upon this plate.

In order to move the ears onto and along the husking-rolls, I have provided an endless belt E. This consists of a sprocket-chain carried upon sprocket-wheels $f$ and $g$ and driven by a sprocket-wheel $h$, which is driven from the shaft C through the sprocket $h'$, Fig. 2, and the chain $h^2$ and larger wheel $h^3$ on the shaft $l$, which carries the sprocket $h$, as shown in Fig. 1. This chain is arranged to move in a guideway $i$, between the two pairs of husking-rolls, and at regular intervals it carries pushing-bars fixed centrally upon the chain and extending laterally each way across the rolls far enough to include the ears of corn resting in the bight of the rolls. The chain moves in the direction of the arrow in Fig. 1, and as the transverse bars K rise and move over the plate D they push the ears over the plate and onto the rolls, and as they continue the movement they carry the ears along over the rolls, whereby said ears are stripped of the husks and are delivered at the other end, where they fall upon an elevator G, by which they are carried up and delivered to any suitable receptacle. The elevator G is connected, as shown at Fig. 1, with the shaft $l$, which is driven, as heretofore stated, from the shaft C by the sprockets $h'$ $h^3$ and chain $h^2$, the elevator-sprocket being connected with the shaft in the manner shown by the chain $l'$ and the sprockets $l^2$ $l^3$. In machines of this sort detached kernels are liable to pass through between the rolls, and in order to save these and dispose of them I form the way $m$ on which the endless belt E travels underneath of open slats, which permit the detached kernels to pass through and to fall upon an endless belt N, which is mounted upon sprocket-wheels $n$ $o$ $p$ and is connected by a chain 2 to sprocket-wheels, as shown at Fig. 2, whereby it is driven, said chain being connected with the sprocket-wheel $p'$, Fig. 2, on the same shaft with the sprocket $p$, Fig. 1. This belt N carries the material dropping upon it and delivers it to the conveyer G, a bottom board N' being provided, as in Fig. 1, with an upturned end to direct the material onto the elevator G.

The endless-belt conveyer may be of the same kind as the above described, and moves over the closed bottom N', on which the kernels rest, or it may be of any known type.

I have also furnished and preferably use a fan K', arranged to drive the dust and bits of husk which may fall through, the fan being directed so as to blow these onto a main carrier O, Fig. 2, driven from the shaft $p^2$ by a sprocket-chain $p^3$, as indicated in Fig. 2. The fan is driven, as also shown in Fig. 1, from the shaft C by a belt K''.

The peculiar construction of the husking-rolls I regard as of great importance. These are shown in place in Figs. 3, 5, and 7.

The heads $4'$ are preferably malleable iron, circular, with central holes for the axles and with notches to receive the steel bars 5. These bars are formed with sharp outer corners, and the bars of each pair are set in the machine to interlock loosely with each other—that is to say, so as not to touch, but by reason of the looseness of the gears to have more play. Thus the bar 7, for example, moving between the bars 8 and 9 and being on the shaft to which the power is directly applied may move toward the lower bar 9 but not quite into contact with it. The husks torn from the ear by the corners of the bars are drawn down and gripped by two bends between the three bars, one bar passing it between two others. Heretofore rubber or yielding bars have been similarly arranged to press against the periphery of an opposite roller and hold the husk between the surfaces by direct pressure; but this in the long rolls is objectionable, and in my rolls there is no pressure of one roll against the other, but the husk is held simply by the interlocking and without lateral pressure between the rolls.

My husking device is materially different from what has heretofore been used, in that it consists of an open roller having a space between the outer face of bars somewhat greater than width of bar, and also having annular space between shaft and inner face of bar so constructed that a pair in operation present no opposing faces, the value of this feature being to diminish resistance offered by passing husks, stalks, &c.; second, because of minimum resistance the tension upon journal-boxes is low. That the tension may be low and do the work is due to the fact that the tendency of the husks is to force the driven roller of a pair in the direction of revolution rather than to separate the rollers. The pressure upon the husks is from the edge of the bars rather than from the faces. Hence instead of exerting a transverse strain upon the journals the husks transfer for the time the function of the actuating gear-tooth to the bar.

The devices for stripping the ears from the stalks are shown in place in side elevation in Fig. 1 and front sectional view in Fig. 4. They are rollers 16 and 17, identical in construction with the husking-rollers, adapted to draw the stalks by firm pressure, but not to permit the ears to pass. They are mounted in a slotted casing, as indicated in Fig. 1, and are pressed together by suitable cushions, so as to grip the stalks. The shafts of these rollers pass through wooden boxes 25, movable vertically in the slotted casing, a rubber cushion 26 being arranged over the upper bearing and adjustable by a screw 27, bearing on a metallic plate upon the rubber cushion, by which the pressure may be regulated, the lower boxes $25'$ for the lower roller also being vertically movable and being on a rubber cushion 28, embedded in the beam 29, Fig. 4. In rear of these rollers are guides 10, which divide the mass of stalks and direct them to splitting-knives 12. The guides have inclined or beveled sides presenting flaring openings to receive the stalks. These knives are made of thin steel, substantially triangular in shape, and mounted on the shaft 30, with spacing-disks between, so that two knives will work in one channel and split and thus reduce the stalks. The same rollers which draw the stalks also serve to feed them to the knives.

The knives are driven by power applied to the shaft 30, on which the knives are arranged, and from the knife-shaft the power is conveyed to the shaft C by chain and sprockets 31 32 and chain 33.

The snapping-rollers 16 and 17 may be thrown out of work by means of the clutches 18 and 19, by means of a lever $20'$, and a fork $18^a$, the latter of which rests in a groove in the clutch 19 for the sprocket of the lower rollers, as shown in Fig. $4^a$, and is supported thereby. The upper part of the double fork engages a groove in the clutch of the upper sprocket, and by moving the fork laterally the clutches 18 19, which are splined to the roller-shafts, will be disengaged from the driving-sprockets. The fork is moved aside by a rod $19'$, slotted to engage the fork and resting upon a collar $19''$ thereon, one end of the rod being connected with the framework by a pivoted link $19^a$ and the other end being connected by a similar link $19^b$, which is extended to form an operating-lever $20'$. The slotted bar thus has a parallel movement and simply slides the clutches to and from the sprocket-wheels.

I arrange guide-bars 33, Fig. 5, on each side to direct the ears and keep them on the rolls, and over the rolls a bar 34 to guide the transverse arms or bars K of the main conveyer-chain E for the ears. This bar, as shown in Fig. 5, may be adjusted so as to maintain the lags or bars K of the chain in exact horizontal position and with their ends in proper relation to the husking-rollers. For this purpose the bar 34 is suspended at its ends by bolts centrally arranged and depending from cross-bars 36, this connection allowing slight vertical adjustment of the bar, and thumb-screws 37 are provided on each side of the central bolt, by which either edge of the bar may be depressed slightly, so as to form a guideway for the bars K and keep the same in horizontal position.

In my machine a single endless chain moves the ears over the husking-rollers and also serves to remove the husks, said chain encircling said rollers longitudinally.

The slitting-knives are substantially in the form of an equilateral triangle with each apex cut off. Furthermore, each front edge is curved inward at its extremity adjacent to the cut-off apex, so as to form curved points at the three respective positions.

The knives have no sharp edges, the cutting or ripping being accomplished by these points. The knives are mounted upon a shaft passing through the center of triangle in gangs of two or three, according to the thickness of plate from which the knives are struck. The plates are separated in the gangs by spacing-disks.

I claim—

1. In a husking-machine a pair of rolls having bars formed with sharp corners, and with the bars of one roller loosely interlocking with those of the other, said interlocking bars being adapted to tear the husk from the ear and presenting no cutting edges to the husk, substantially as described.

2. In combination in a husking-machine, a pair of open rollers each roll comprising a series of bars arranged at intervals about a central shaft with spaces between the bars and between the bars and the shaft, the bars of one roller being arranged to fit loosely within the space between those of the other roller and also the annular space about the shaft.

3. In combination in a husking-machine, a pair of open rollers each consisting of a shaft, a series of collars thereon with spaces between and the bars connecting the collars, those of one roller being arranged to interlock with those of the other roller, said collars having overhanging notched edges to receive the fastening-bolts of the bars, substantially as described.

4. In a corn-husking machine, a pair of open rollers having bars formed with substantially rectangular corners and with the bars of one roller loosely interlocking with those of the other, said interlocking bars being adapted to grasp the husk between contiguous edges of bars, substantially as described.

5. In combination in a corn-husking machine, a plurality of pairs of husking-rollers and a conveying chain or belt, moving between them, a guideway between the pairs of rollers for the chain or belt, to prevent lateral motion of the same, the bars extending laterally from the chain, or belt, to move the ears along the husking-rollers and also to convey the husks, silk, &c., in reverse direction, the guide-bar over chain, or belt to maintain the horizontal position of bars and also to protect chain, or belt from falling ears of corn, and the slatted bottom $m$, over which the chain passes to discharge the husks, substantially as described.

6. In combination in a corn-husking machine, a plurality of pairs of husking-rollers, a conveying-chain moving between them, a guideway between the rollers for the chain, the bars extending laterally from the chain to move the ears, the guide-bar over the said arms and means for adjusting the guide-bar to maintain the cross-bars horizontally, substantially as described.

7. In combination, in a corn-husking machine, a knife-shaft and knives mounted thereon, each knife being of triangular form with its apices cut off and with its front edge curved inward at its extremity adjacent to the cut-off apex, substantially as described.

8. In combination, the snapping-rollers, the slitting-knives, and the guides between the rollers and the knives projecting upwardly across the bight of the rollers and opposite the spaces between the knives to offer obstructions to the movements of the stalks into said spaces and to deflect them laterally to the knives as they come in a mass from the feeding-rollers, substantially as described.

9. In combination, the snapping-rollers, the slitting-knives arranged in pairs and the guides between the rollers and the knives, projecting upwardly across the bight of the rollers and opposite the spaces between the pairs of knives to prevent the stalks from entering said spaces and to divide them up and guide them to the knives, each pair of knives being arranged to act on different parts of the same stalk and to tear the same into shreds, substantially as described.

10. In combination, the snapping-rollers, the revolving knives adapted to rip the stalks into shreds, and the intermediate guides having beveled, or inclined faces, the said guides projecting upwardly across the bight of the rollers and the path of the stalks and serving to divide up and direct the stalks to the revolving ripping-knives as said stalks come in a mass from between the rollers, substantially as described.

11. In combination, the snapping-rollers and the revolving slitting-knives each comprising a pair of triangular plates arranged with their cutting-points alternating and the space-disks between the plates.

In testimony whereof I affix my signature in presence of two witnesses.

CHARLES E. CURTISS.

Witnesses:
WALTER DONALDSON,
HENRY E. COOPER.